Patented Feb. 22, 1938

2,109,095

UNITED STATES PATENT OFFICE 2,109,095

INSECTICIDAL OIL COMPOSITION

William Hunter Volck, Watsonville, Calif., assignor to California Spray-Chemical Corporation, Berkeley, Calif., a corporation of Delaware No Drawing. Application June 30, 1934, Serial No. 733,251

4 Claims. (Cl. 167—28)

The present invention relates to a new and improved insecticidal composition and more particularly to an insecticidal oil composition which is substantially self-emulsifying and hence is particularly adapted to the so-called "tank-mix" or "in the field" method of preparing insecticidal oil emulsions and to a method of producing the same.

Numerous so-called "soluble" or "miscible" oils have in the past been prepared for various uses. Such oils have possessed the general property of spontaneous dispersion on contact with water or at least of being readily dispersed upon vigorous agitation with water. They have thus been self-emulsifying to the extent that they might have been employed in the tank-mix process of insecticidal emulsion preparation.

It is a fact, however, that the oil soluble materials which have been employed as "internal emulsifiers" in the preparation of these soluble oils have usually been of such character as to make even the most phytonomic oils destructively harmful to growing vegetation when the emulsifiers have been used in quantity sufficient to render the oil self-emulsifying to a useful degree. Use of the well known soluble oils in insecticidal emulsion preparation has therefore received but very little favorable consideration.

A step in the direction of a really satisfactory tank-mix insecticidal oil composition was made with the discovery of the class of oil soluble "polar" emulsifiers described in U. S. Patent #1,707,469 issued April 2, 1929, to Hugh Knight. While these internal emulsifiers are much less phytocidal than the older oil soluble emulsifiers they have generally failed of widespread utilization because they imparted self-emulsifiability to the insecticidal oil in insufficient degree, they were too critical in operation or they were uneconomical.

It is the broad object of this invention to provide an insecticidal oil composition for tank-mix emulsion preparation which shall have none of the foregoing defects and which shall be simple in operation, readily available and economical in use.

I have discovered that certain of the oil soluble alkali sulfonates resulting from the refining or treatment of petroleum distillates or extracts therefrom may when properly purified and neutralized be used in relatively small amounts as internal emulsifiers for use in dormant or winter sprays and in still smaller amounts in combination with what we may call an interfacial tension agent in the production of self-emulsifying insecticidal oils of wide application and very great utility.

While some attempts have hitherto been made to employ oil soluble petroleum sulfonates in the preparation of self-emulsifying insecticidal oils such attempts have, so far as I am aware, met with little or no success. When used alone these sulfonates are required in amounts of 20% to 40% by weight relative to the oil in order to render a phytonomic oil self-emulsifying. Such high percentages are, as might be expected, decidedly harmful to growing vegetation and therefore could be used, if at all, only in dormant sprays. So far as I am aware no utility of lesser amounts of these materials alone has hitherto been disclosed for producing self-emulsifying oil compositions.

In carrying out my invention I employ the oil soluble sulfonates produced from petroleum distillates in the boiling range of heavy kerosenes, mineral seal oils or light to medium lubricating oils, i. e., oils of molecular weight from about 200 to 400 or above. These sulfonates as produced or usually after careful neutralization are dissolved in the desired phytonomic oil in relatively small proportions, always less than 10% and usually less than 1% by weight of the oil. For the preparation of a general utility composition for summer spray work from 0.2% to about 0.6% will be found to give good results. For winter or dormant sprays from 3% to 10% may be employed if desired.

Oils containing very low percentages of sulfonates for instance below about 3.0% by weight of the oil have been found to be substantially harmless to growing vegetation and to be usable under substantially all conditions. They are, however, not self-emulsifying to any useful degree and it becomes necessary to add to them a third component which appears to have the function of powerfully affecting the interfacial tension between such oil solutions of sulfonates and water.

It has been found that certain organic liquids which are both oil soluble and water soluble to a rather high degree are particularly useful in rendering oils containing very low concentrations of alkali sulfonates easily emulsifiable with water which contains no additional emulsifier of any sort. Certain low molecular weight ketones, alcohols, aldehydes, esters, amines, ethers, amides and the like having an appropriate coefficient of distribution between oil and water are effective in this respect. From this group the individual compound which appears to combine the highest degree of efficiency and economy with the most ready availability is dimethyl ketone or ordinary acetone.

The quantity of such third ingredient which it is necessary to use in order to secure the necessary reduction in interfacial tension will of course depend upon the particular individual compound employed and I believe in large part at least upon the ratio between its water solubility and its oil solubility and upon the absolute magnitude of these quantities which I believe should be as high as possible.

In the case of acetone 0.25% by volume on the basis of the oil used produces a marked effect and 1.0% will usually be found entirely adequate for all ordinary use though so far as I have yet found larger amounts might be employed without harmful effect if desired.

An insecticidal oil in the range of a light lubricating oil, straw oil or mineral seal distillate rendered self-emulsifying for ordinary summer use through the practice of this invention might thus contain 0.6% of the oil soluble sulfonate and 1% of acetone. Such a composition is substantially non-phytocidal when a phytonomic oil is used, is readily self-emulsifying, forms an adequately stable though still quick breaking emulsion and is, in every respect, admirably suited for tank-mix emulsification in insect control work.

For winter or dormant application it has been found that when the sulfonates have been substantially neutralized they may be employed up to 10% by weight of the oil without harmful effect on the sprayed host. With such amounts of sulfonate, it may under certain conditions not be necessary to employ an interfacial tension modifying agent in order to secure satisfactory tank-mix emulsification, though in general it may be preferable to do so.

The sulfonates as marketed are usually in solution in oil and often contain an appreciable excess of alkali. This may best be neutralized with an oil soluble organic acid such as glacial acetic whereupon the liberated alkali acetate slowly settles out and may be removed by filtration or decantation.

Having now described my invention which consists of an insecticidal oil rendered self-emulsifying through solution therein of less than ten percent of a neutral oil soluble alkali sulfonate with or without a mutually oil and water soluble non-phytocidal organic substance as an interfacial tension modifier, what I claim is:

1. A phytonomic insecticidal oil composition consisting of a mineral oil in which is dissolved less than about 3% by weight, relative to the oil, of alkali salts of sulfonic acids from petroleum and an organic substance which is both oil and water soluble to a high degree in an amount adequate to lower the interfacial tension between the composition and water to the point that emulsification may be effected without the aid of any additional emulsifying agent.

2. A phytonomic insecticidal oil composition consisting of a mineral oil in which is dissolved less than about 3% by weight, relative to the oil, of alkali salts of sulfonic acids from petroleum and an organic liquid of relatively low molecular weight which is both oil and water soluble to a high degree in an amount adequate to lower the interfacial tension between the composition and water to the point that emulsification may be effected without the aid of any additional emulsifying agent.

3. A phytonomic insecticidal oil composition as in claim 1 wherein the organic interfacial tension depressant is acetone.

4. A phytonomic oil composition consisting of a mineral oil containing in solution less than 3% by weight sulfonic salts from petroleum and about 1% of acetone.

WILLIAM HUNTER VOLCK.